US006088666A

United States Patent [19]

Chang et al.

[11] Patent Number: 6,088,666

[45] Date of Patent: Jul. 11, 2000

[54] METHOD OF SYNTHESIZING PRONUNCIATION TRANSCRIPTIONS FOR ENGLISH SENTENCE PATTERNS/WORDS BY A COMPUTER

[75] Inventors: Jackson Chang, Taipei, Taiwan; Hale Cao; Jerry Chang, both of Beijing, China

[73] Assignee: Inventec Corporation, Taipei, Taiwan

[21] Appl. No.: 08/901,691

[22] Filed: Jul. 28, 1997

[30] Foreign Application Priority Data

Oct. 11, 1996 [TW] Taiwan ................................ 85112444

[51] Int. Cl.[7] .............................. G06F 17/20; G10L 5/02; G10L 9/00

[52] U.S. Cl. ................................................ 704/1; 704/258

[58] Field of Search ................................ 704/1, 258, 260

[56] References Cited

U.S. PATENT DOCUMENTS 4,692,941 9/1987 Jacks et al. ............................ 704/260
5,673,362 9/1997 Matsumato .............................. 704/260
5,799,276 8/1998 Komissarchik et al. ................ 704/251

*Primary Examiner*—Forester W. Isen
*Assistant Examiner*—Patrick N. Edouard
*Attorney, Agent, or Firm*—Jacobson, Price, Holman & Stern, PLLC

[57] ABSTRACT

A method of synthesizing pronunciation transcriptions for English sentence patterns/words through a computer, including the step of searching out matching rules sign for every individual letter or letter series from a pronunciation rules chart set in the computer subject to the location of every individual letter or letter series in the word and its relationship with the neighbor letters or letter series, the step of searching out the corresponding IPA pronunciation symbols for every individual letter of the word from a pronunciation rules data bank set in the computer, and the step of synthesizing the pronunciation symbols for the individual letters of the word into a pronunciation transcription.

4 Claims, 2 Drawing Sheets

METHOD OF SYNTHESIZING PRONUNCIATION TRANSCRIPTIONS FOR ENGLISH SENTENCE PATTERNS/WORDS BY A COMPUTER

BACKGROUND OF THE INVENTION

The present invention relates to a method of synthesizing pronunciation transcriptions for English sentence patterns/words by a computer which includes the step of searching out matching rules sign for every individual letter or letter series of the word from a pronunciation rules chart set in the computer subject to the location of every individual letter or letter series in the word and its relationship with the neighbor letters or letter series, the step of searching out the corresponding International Phonetic Alphabet (IPA) pronunciation symbols for every individual letter of the word from a pronunciation rules data bank set in the computer, and the step of synthesizing the pronunciation symbols for the individual letters of the word into a pronunciation transcription.

FIG. 1 shows a block diagram explaining a method of synthesizing pronunciation symbols for sentence patterns/words by computer according to the prior art. This method includes the steps of:

1. inputting English sentences into a computer:
2. processing inputted English sentences into individual English words by a processor of the computer;
3. fetching the corresponding pronunciation transcription for the individual English words from a word to pronunciation transcription converter.

Because the word to pronunciation transcription converter is a data bank of word-pronunciation transcription conversion table, it occupies much memory storage space. Another drawback of this method is its complicated searching procedure which limits the processing speed of the pronunciation synthesizing process.

SUMMARY OF THE INVENTION

The present invention provides a pronunciation synthesizing method which eliminates the aforesaid drawbacks. The design of the present invention greatly improves the pronunciation synthesizing speed, and saves much computer data storage space. The method of the present invention is to search out matching rules signs for every individual letter or letter series of the word to be pronounced from a pronunciation rules chart set in the computer subject to the location of every individual letter or letter series in the word and its relationship with the neighbor letters or letter series, and then to search out the corresponding IPA pronunciation symbols for every individual letter or letter series of the word from a pronunciation rules data bank set in the computer, and then to synthesize the pronunciation symbols for the individual letters of the word into a pronunciation transcription.

DETAILED DESCRIPTION OF THE PREFERRED EMBODIMENT

Figure 1:
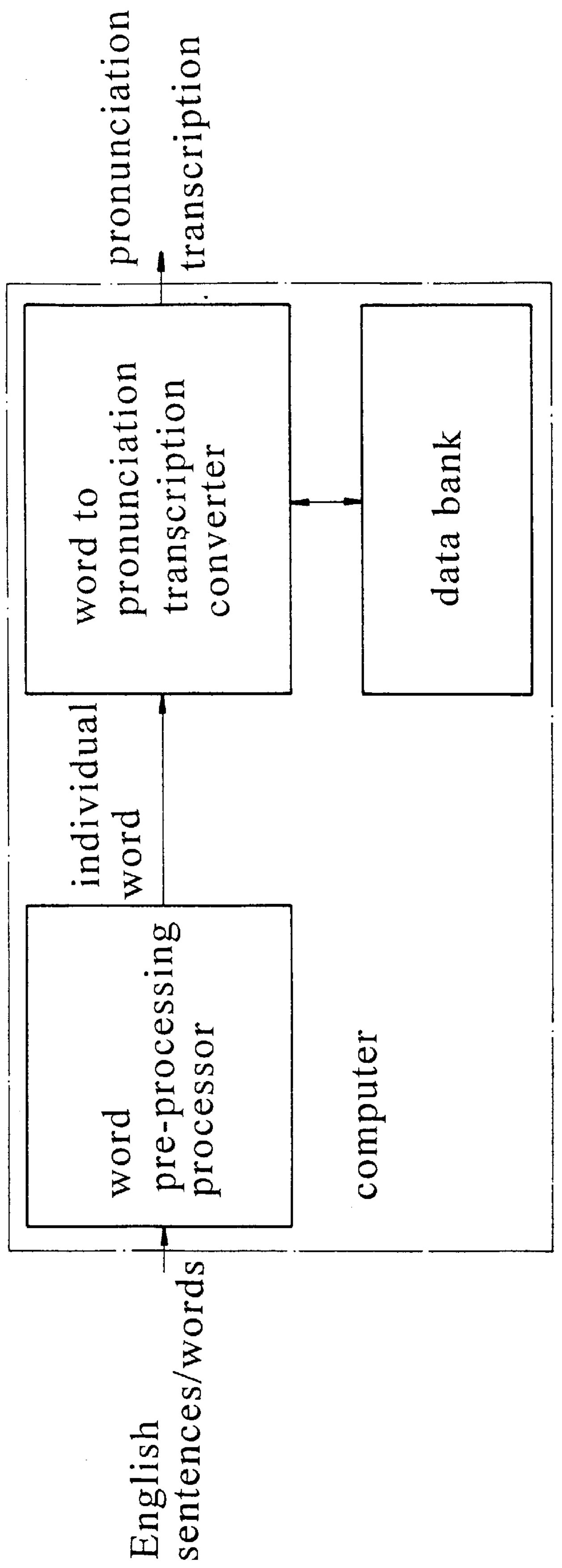
FIG. 1 PRIOR ART
FIG. 1 is a block diagram explaining a method of synthesizing pronunciation symbols for sentence patterns/words by computer according to the prior art.

The present invention provides a pronunciation rules data bank by which pronunciation symbols for words are produced. English language uses 26 letters as basic elements for composing words and sentences. The pronunciation of a letter in a single word is mainly based on the location of the letter in the word and the relationship between the letter and the neighbor letters before and after the letter. The pronunciation rules data bank is set up by gathering the variations of the pronunciation of letters, combination of letters in different words at different locations.

According to the present invention, when English sentences are inputted into a computer, they are processed into individual English words by a word pre-processing processor of the computer, and then the matching pronunciation symbols for the individual English words are searched from the pronunciation rules data bank and synthesized into correct IPA pronunciation transcriptions for the individual words.

The technique of the pronunciation rules is to represent pronunciation rules by signs. For example, in the English word "HELLO", the pronunciation of each individual letter is affected by the neighbor letters or series of letters before and after it, i.e., 1) the pronunciation of letter "H" is affected by the blank before it and the letter "E" after it;

2) the pronunciation of letter "E" is affected by the letter "H" before it and the letter "L" after it;

3) similarly, the pronunciation of the other letters is affected by their neighbor letters.

For easy understanding of the technique of the pronunciation rules, it is illustrated by a pronunciation rules chart as follows:

| letter/letter series | pronunciation style | sign |
|---|---|---|
| | blank | B |
| A,E,I,O,U,Y | single or multiple vowels | V |
| B,D,V,G,J,L,M,N,R,W,Y,Z | voiced consonants | T |
| ER,E,ES,ED,ING,ELY | appendix | S |
| S,C,G,Z,X,J,CH,SH | consonants with a neighing sound | X |
| B,C,D,F,G,H,J,K,M,N,P,Q, R,S,T,V,W,X,Y,Z | single consonant | C |
| E,I,Y | prefix vowel | F |
| B,P,W | lip consonant | L |

According to the aforesaid pronunciation rules chart, the rules signs for the English word "HELLO" are listed as follows:

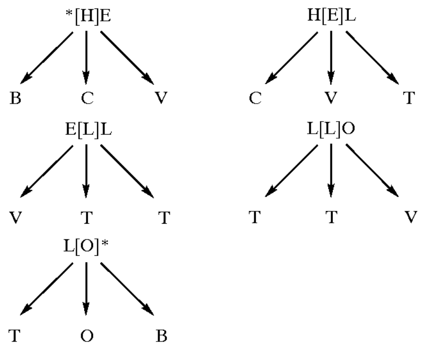

in which, L[O]* means that the pronunciation of the last letter "O" of the word "HELLO" is affected by the left-sided letter "L" and the right-sided blank space "*", i.e., the pronunciation of a letter in a word is subject to its location in the word and the relationship between the letter and its neighbor letters. The pronunciation rules data bank of the present invention is set up according to this manner. When to synthesize the pronunciation transcription of the English word "HELLO", the computer is controlled to search from the pronunciation rules data bank stored therein the IPA pronunciation symbols corresponding to the related rules signs of every individual letter of the word as follows:

BCV→<*h>

CVT→<ha>

VTT→<al>

TTV→<lo>

TOB→<o*>

Then, the pronunciation symbols <*h>, <ha>, <al>, <lo>, <o*> are synthesized into the IPA pronunciation transcription <halo> for the English word "HELLO".

Figure 2:
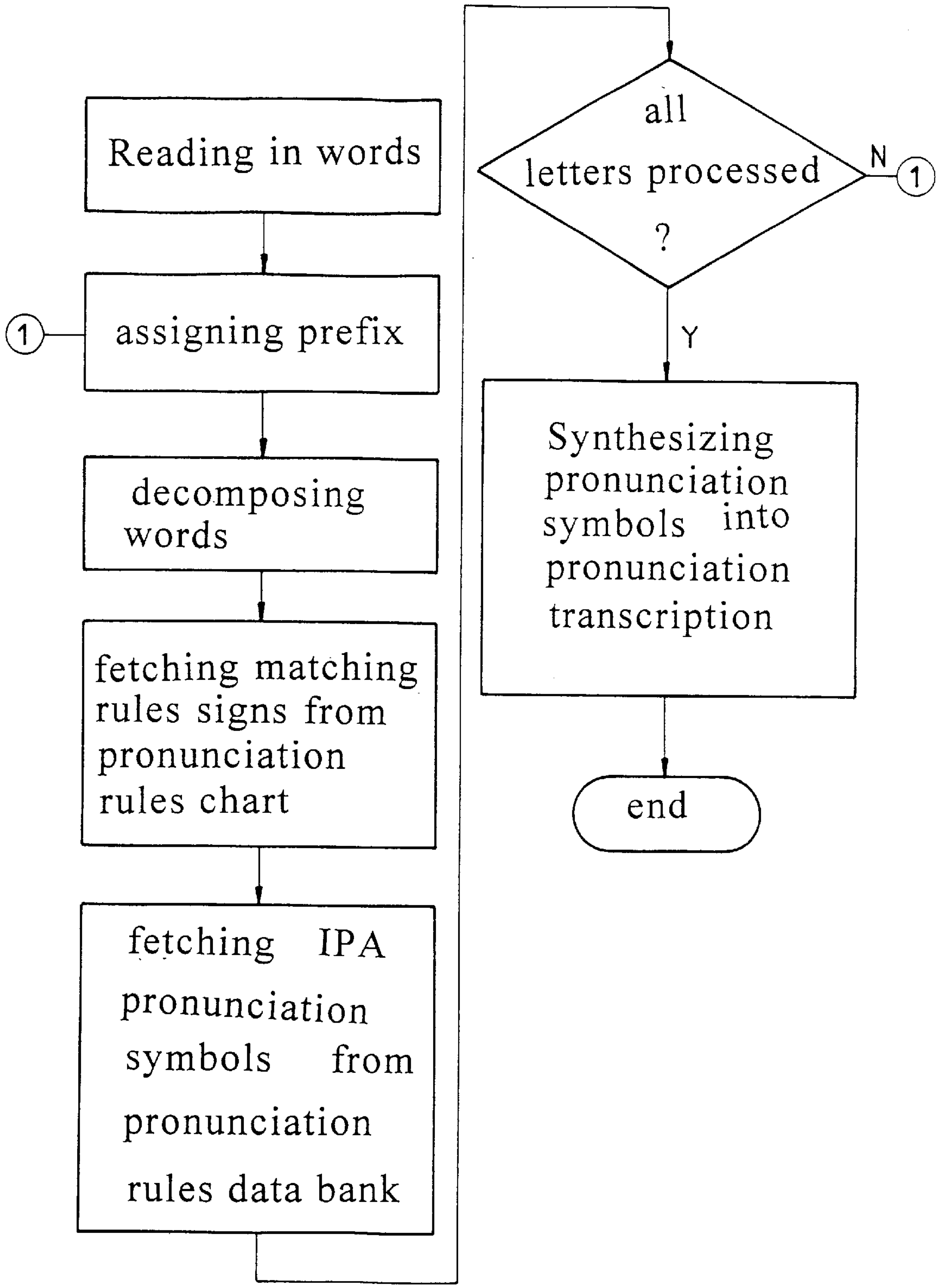
FIG. 2 is a block diagram explaining a method of synthesizing pronunciation symbols for sentence patterns/words by computer according to the present invention.

Further, when editing the pronunciation rules data bank, the more complicated rules are set at the front side and the less complicated rules are set at the rear side, and then a rules index is set up subject to the order of the rules signs for permitting the computer to search out the corresponding IPA pronunciation transcription of the word according to the procedure shown in FIG. 2, which includes the steps of:

1. reading in the English word to be pronounced;
2. assigning the prefix of the word by means of an index sign;
3. decomposing the composition of the word subject to the location of the assigned letter in the word and its relationship with the neighbor letters;
4. searching out the matching rules sign from the pronunciation rules chart subject to the location of the assigned letter in the word and its relationship with the neighbor letters;
5. searching out the corresponding IPA pronunciation symbol from the pronunciation rules data bank for the assigned letter;
6. judging if all individual letters of the word have been processed?
7. synthesizing the pronunciation symbols of the individual letters or letter series of the word into a pronunciation transcription when all individual letters of the word have been processed, or shifting the index sign to the next letter and then repeating the procedure from step 2).

While only one embodiment of the present invention has been shown and described, it will be understood that various modifications and changes could be made thereunto without departing from the spirit and scope of the invention disclosed.

What the invention claimed is:

1. A method of synthesizing pronunciation transcriptions for English sentence patterns/words through a computer, comprising the steps of:

i) reading in a word to be pronounced;

ii) assigning a prefix of the word by means of an index sign;

iii) decomposing a composition of the word subject to a location of an assigned letter in the word and its relationship with neighboring letters;

iv) searching out matching rules sign from a pronunciation rules chart set in the computer subject to the location of the assigned letter in the word and its relationship with the neighbor letters;

v) searching out a corresponding International Phonetic Alphabet (IPA pronunciation symbol from a pronunciation rules data bank set in the computer for the assigned letter;

vi) judging if all individual letters of the word have been processed; and, vii) synthesizing pronunciation symbols of the individual letters or letter series of the word into a pronunciation transcription when all individual letters of the word have been processed, or shifting the index sign to the next letter and then repeating the steps from iii) to vii).

2. The method of synthesizing pronunciation transcriptions for English sentence patterns/words through a computer according to claim 1, wherein the IPA pronunciation symbol or symbols for an individual letter or a letter series of the word to be pronounced are searched out from the pronunciation rules data bank through a rules index chart.

3. The method of synthesizing pronunciation transcriptions for English sentence patterns/words through a computer according to claim 1, wherein said pronunciation rules chart is obtained by gathering the pronunciation styles and corresponding rules signs of every individual letter or letter series in English words into a chart.

4. The method of synthesizing pronunciation transcriptions for English sentence patterns/words through a computer according to claim 1, wherein said pronunciation rules data bank is set up by matching rules signs with different pronunciation symbols, which rules signs representing individual letters or letter series in English words subject to their locations in respective English words and their relationship with the neighbor letters or letter series.

* * * * *